Nov. 25, 1930.  H. W. BOWLY ET AL  1,782,404
CLAMPING DEVICE
Filed April 30, 1929   2 Sheets-Sheet 1
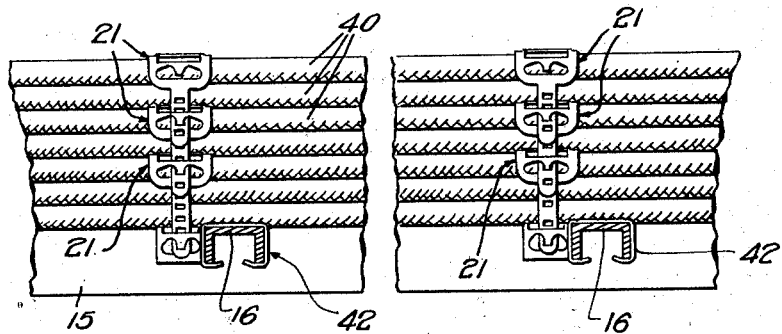
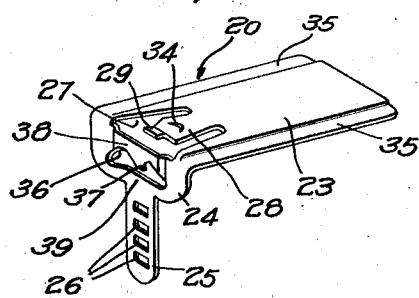
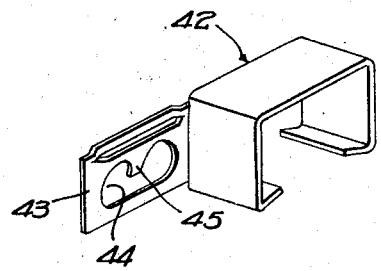
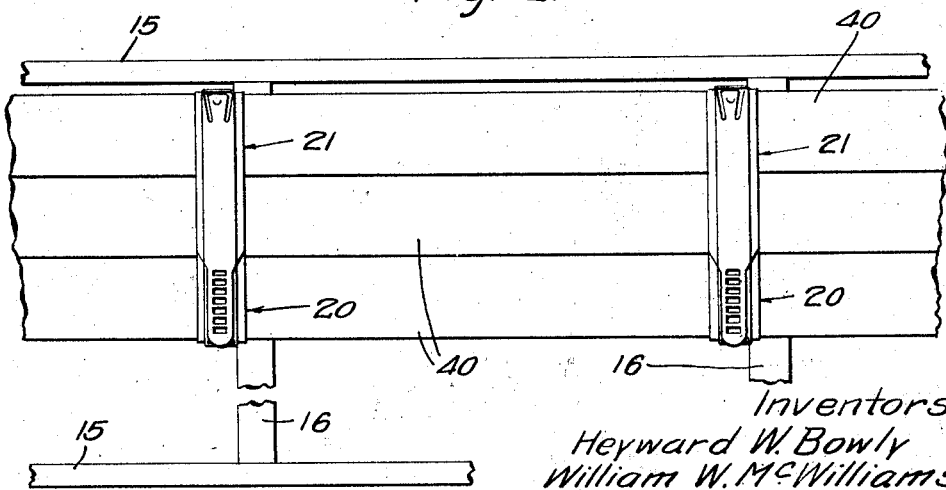
Inventors
Heyward W. Bowly &
William W. McWilliams

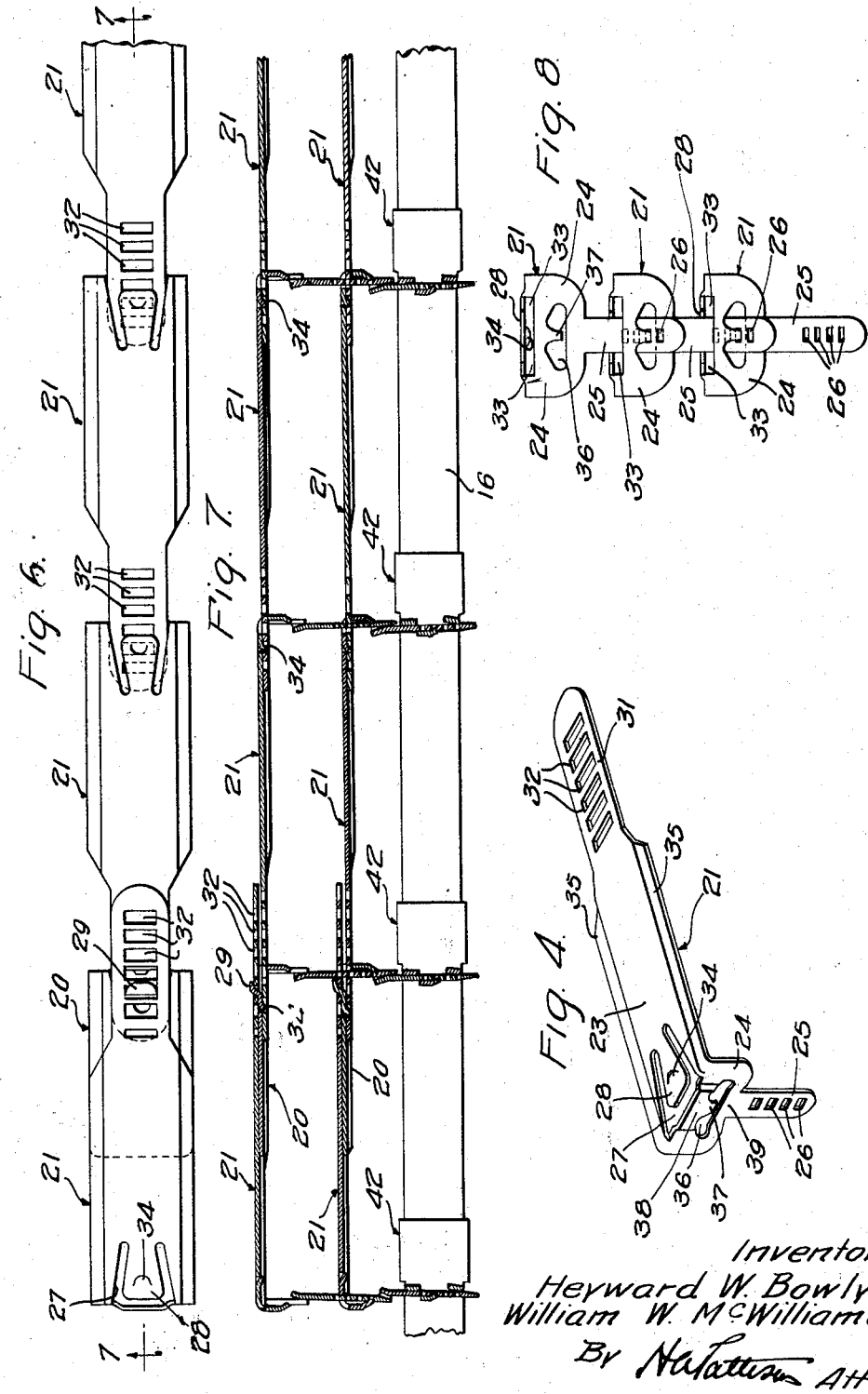

Patented Nov. 25, 1930

1,782,404

UNITED STATES PATENT OFFICE

HEYWARD WIRGMAN BOWLY, OF SUMMIT, AND WILLIAM WINEBIDDLE McWILLIAMS, OF SOUTH ORANGE, NEW JERSEY, ASSIGNORS TO WESTERN ELECTRIC COMPANY, INCORPORATED, OF NEW YORK, N. Y., A CORPORATION OF NEW YORK

CLAMPING DEVICE

Application filed April 30, 1929. Serial No. 359,344.

This invention relates to clamping devices, and more particularly to devices for fastening strands or cables to supports and to each other.

The invention has for its principal object the provision of improved and readily adjustable clamping devices of simple and economical construction for attaching strands or cables to a supporting framework and to each other.

In accordance with the above object, the invention contemplates the provision of an improved cable clamping device consisting of flat metal strip material formed into a two sided right angle member having reduced extremities provided with a plurality of transverse slots for selective interlocking engagement with offset lips of cooperating similar members to provide horizontal and vertical adjustment for accommodating various numbers and sizes of cables.

A more complete understanding of the invention will be had from the following detailed description, reference being had to the accompanying drawings, wherein Fig. 1 is a fragmentary side elevational view, partly in section, of a group of cables shown attached to a supporting framework and to each other by means of clamping devices embodying the features of the invention, Fig. 2 is a fragmentary plan view of the structure shown in Fig. 1, Figs. 3 and 4 are enlarged perspective views of clamping devices embodying the features of the invention, Fig. 5 is an enlarged perspective view of a base clamp which may be employed with the improved clamping devices for attaching cables to a supporting framework, Fig. 6 is a plan view of a plurality of interlocked clamping devices embodying the features of the invention, Fig. 7 is a vertical section taken on line 7—7 of Fig. 6 with the lower clamping devices shown attached to the framework by means of cooperating base clamps, and Fig. 8 is an end elevational view of a plurality of clamping devices shown interlocked in a vertical row.

Clamping devices embodying the features of the invention may be employed to advantage in telephone exchanges for attaching the cables of electrical conductors interconnecting the electrical apparatus, to a supporting framework. As shown in Figs. 1 and 2, the cable supporting framework may consist of a pair of spaced parallel bars or stringers 15 interconnected by a plurality of spaced cross straps 16, preferably formed of channel iron. The cables are usually attached to the framework with their longitudinal axes parallel to the stringers 15 and at right angles to the cross channels 16. It will be observed that the clamping devices supporting the first few layers of cables are attached to suitable base clamps secured at predetermined positions along the channels 16. Additional layers or groups of cables are fastened to the preceding layers by means of clamping devices which are adapted to be interlocked with the devices supporting the preceding layers.

In its preferred form, the improved clamping device consists of flat strip material, preferably sheet metal, formed into a two sided right angle member 20 (Fig. 3) for partially enclosing a group of cables and provided with means for engaging a cooperating similar member 21 (Fig. 4) to attach the enclosed cables to a supporting framework or to a previously supported group of cables. Each of the clamping members 20 and 21 comprises a horizontal portion 23 and a vertical portion 24, the vertical portion terminating in a reduced end portion 25 provided with a plurality of spaced transverse slots 26, 26. A substantially U-shaped slot 27 is cut in the horizontal portion at the end adjoining the vertical portion so as to provide a horizontal prong 28. The prong 28 of the clamping member 20 terminates in an offset lip 29 for engaging the horizontal portion of a cooperating clamping member 21 to provide a U-shaped enclosure (Fig. 7) for accommodating a cable or group of cables. It will be observed that the horizontal portion 23 of the clamping member 21 terminates in a reduced end portion 31 having a plurality of spaced transverse slots 32 for selective interlocking engagement by the offset lip 29 of a cooperating clamping member 20 to provide horizontal adjustment for accommodating various numbers and sizes of cables.

The vertical portion 24 of each of the clamping members 20 and 21 is slotted at its juncture with the horizontal portion 23, as indicated at 33 (Fig. 8), for accommodating the reduced horizontal portion 31 of a cooperating clamping member 21 as shown in Fig. 7. A depending lip 34 formed in the prong 28 is adapted to selectively engage the transverse slots 32 of the reduced horizontal end portion 31 of a cooperating clamping member 21 to provide horizontal adjustment. The horizontal portion 23 of the clamping members 20 and 21 are provided with offset edges 35 for engaging the cables whereby a space is provided between the cables and the clamping members for accommodating the reduced horizontal portion of a cooperating clamping member. The offset edges 35 also serve to stiffen the horizontal portion of the clamping members.

A special slot 36 is cut in the vertical portion 24 to provide a depending prong or lip 37. The vertical portion above the slot 36 is bent outwardly, as indicated at 38, and the portion below the slot is bent inwardly, as indicated at 39, to form, in effect, a pocket for accommodating the reduced vertical end portion 25 of a cooperating clamping member. It will be observed that the depending prong 37 is bent inwardly and is adapted to selectively engage the transverse slots 26 of the reduced vertical end portion 25 of a cooperating clamping member to provide vertical adjustment for accommodating various numbers and sizes of cables. This vertical adjustability also provides a simple and efficient means for accommodating slight variations in the dimensions of similar types or sizes of cables, such as may be caused by slight variations in the sizes of the composite conductors or by other variations encountered in commercial manufacturing conditions. Furthermore, the clamping devices automatically adjust themselves to dimensional variations of the cables resulting from the compressing force of superimposed layers of cables.

When employing the clamping members 20 and 21 for attaching a run or group of cables 40 (Figs. 1 and 2) to a supporting framework, the clamping members enclosing the first layers or groups of cables are attached to suitable base clamps adapted to be secured to the framework. Thus, as shown in Fig. 1, the clamping members enclosing the first two layers of cables 40 are attached to base clamps 42, 42 secured to the cross channels 16. The base clamp 42 may consist of flat sheet material, preferably spring steel, formed into a three sided loop adapted to be clamped to a channel 16 and having one side formed with an outwardly extending vertical portion 43 which is slotted as indicated at 44 to provide a depending prong 45 similar to the depending prongs 37 of the clamping members 20 and 21. The vertical portion 43 of the base clamp is formed similarly to the vertical portion of the clamping members so as to provide a pocket for accommodating the reduced vertical end portion 25 of a clamping member. The prong 45 is bent inwardly and is adapted to selectively engage the transverse slots 26 of the reduced vertical end portion 25 of a clamping member to provide vertical adjustment.

In attaching a run or group of cables to a supporting framework, the base clamps 42 are first clamped at predetermined positions along each or certain of the cross channels 16 and a group of cables is then arranged in horizontal layers along the cross channels in the spaces defined by a pair of adjacent base clamps. Clamping members 20 and 21, interlocked as shown in Figs. 6 and 7, are then placed around the cables and are pressed downwardly to firmly clamp the cables to the channels 16, the reduced vertical end portions 25 of the clamping members extending into the pockets of the base clamps and automatically becoming interlocked therein by the engagement of the prong 45 with one of the transverse slots 26, as hereinbefore described. In a similar manner, additional cables may be superimposed upon a previously supported group of cables and may be readily and securely attached thereto by cooperating clamping members 20 and 21 adapted to be interlocked with the preceding clamping members. In such instances, the reduced vertical end portions of the clamping members enclosing the additional cables extend into the vertical pockets of the preceding clamping members and are automatically interlocked therein by the engagement of the prongs 37 of the preceding members with the transverse slots 26 of the reduced end portions 25 of the superimposed members. It will be observed that the slots 32 of the reduced horizontal portion 31 of the clamping member 21 are so spaced that upon the interlocking of the horizontal portions of the clamping members one of the slots 32 registers with the vertical pocket of the cooperating or preceding clamping member to permit the insertion of the reduced vertical portion 25 of a superimposed clamping member.

When desired, additional cables or groups of cables may be attached to an adjacent group of previously supported cables as well as to a supporting framework or to a previously attached layer of cables by means of clamping members 21 adapted to interlock with preceding clamping members as shown in Fig. 7. In such instances, the reduced horizontal portions 31 of the clamping members enclosing the additional cables are interlocked with the horizontal portions of the clamping members supporting the adjacent group of cables in the manner hereinbefore described. Likewise, the reduced vertical portions 25 of the clamping members enclosing the additional cables are interlocked with base clamps 42 or with the vertical portions of the clamping members supporting the preceding layer of cables. In this manner various numbers and sizes of cables or groups of cables may be readily and securely interlocked in the form of a composite or unitary structure securely attached to a supporting framework.

It is to be understood that the embodiment of the invention herein illustrated and described merely represents a convenient and useful form of the invention which is capable of other applications within the scope of the appended claims.

What is claimed is:

1. A clamping device comprising a two sided member, one side having a depressed prong and a plurality of spaced transverse slots for adjustable interlocking engagement with the depressed prong of another member and the other side having a portion for attachment to a supporting member.

2. A clamping device comprising a two sided member, one side having a transverse slot and an offset portion adjacent to the other side for interlocking engagement with the transverse slot of another member and the other side having a portion for attachment to a supporting member.

3. A clamping device consisting of sheet material formed into a two sided member having slot engaging means and terminating in reduced end portions having spaced transverse slots for adjustable interlocking engagement with the slot engaging means of another member.

4. A cable clamping device consisting of sheet material formed into a two sided member having one side formed with offset edges for engaging a cable and terminating in a portion formed with means for adjustable interlocking engagement with another member and the other side having a portion for attachment to a supporting member.

5. A cable clamping device comprising a two sided member, each side having an offset prong and a plurality of spaced transverse slots for selective interlocking engagement with spaced transverse slots and offset prongs respectively of other two sided members to provide an adjustable enclosure for cables of various sizes.

6. A clamping device comprising a two sided member consisting of a horizontal portion and a vertical portion, the vertical portion terminating in a reduced end portion provided with a plurality of spaced transverse slots for adjustable interlocking engagement with a second member, and the horizontal portion having a partially severed portion formed with an offset lip for interlocking engagement with a third member.

7. A cable clamping device comprising a two sided right angle member consisting of a vertical portion and a horizontal portion, the vertical portion having an offset lip and terminating in a reduced end portion having a transverse slot for interlocking engagement with the offset lip of another member to provide vertical adjustment.

8. A cable clamping device comprising a two sided right angle member consisting of a vertical portion and a horizontal portion, the vertical portion having an offset lip and terminating in a reduced end portion having a plurality of spaced transverse slots for selective interlocking engagement with the offset lip of a second member to provide vertical adjustment, and the horizontal portion having a depressed prong for interlocking engagement with the horizontal portion of a third member.

9. A cable clamping device comprising a two sided member having offset portions and provided with spaced transverse slots in each side for selective interlocking engagement with the spaced transverse slots and offset portions of cooperating members to provide an adjustable enclosure for accommodating various numbers and sizes of cables.

10. A cable clamping device comprising a two sided right angle member, one side provided with a lip engaging portion and having a partially severed portion in one side terminating in an offset lip for interlocking engagement with lip engaging portions of other members.

11. A cable clamping device comprising a two sided member, one side terminating in a reduced end portion and having a pocket portion for accommodating the reduced end portion of another member and the other side formed for interlocking engagement with a supporting member.

12. A clamping device comprising a two sided right angle member consisting of a vertical portion and a horizontal portion, the vertical portion having a slot for accommodating the horizontal portion of a second member, and the horizontal portion having a slot for accommodating the vertical portion of a third member, each of said portions having means for adjustable interlocking engagement with corresponding portions of other members.

13. A cable clamping device comprising a two sided member, one side terminating in a reduced end portion and having a pocket portion for accommodating the reduced end portion of another member, and the other side having spaced transverse slots and a partially severed portion formed with a depressed prong for adjustable interlocking engagement with the slots of another member to provide an adjustable enclosure.

14. A cable clamping device comprising a two sided right angle member consisting of a vertical portion and a horizontal portion, the vertical portion having an offset lip and terminating in a reduced end portion having a plurality of spaced transverse slots for selective interlocking engagement with the offset lip of a second member to provide vertical adjustment, and the horizontal portion having a depressed prong and terminating in a reduced end portion having a plurality of spaced transverse slots for selective interlocking engagement with the depressed prong of a third member to provide horizontal adjustment.

15. A cable clamping device comprising a two sided member, one side having means for attachment to a supporting member and the other side terminating in an end portion and having an offset loop portion for retaining in parallel relationship with the end portion a similar slotted end portion of another member, the loop portion having a projection for selectively engaging the slotted end portion to retain the end portions in selected relative longitudinal relationship.

16. A cable clamping device comprising a two sided member terminating in slotted end portions for attachment to supporting members, one of the sides having an offset loop portion for retaining in parallel relationship with the associated end portion, a similar slotted end portion of another member, the loop portion having a projection for selectively engaging the slotted end portion of the other member to retain the parallel end portions in selected relative longitudinal relationship, and the other side provided with a slot for admitting the corresponding slotted end portion of a third member and a resiliently supported projecting portion for selectively engaging the slots of the admitted end portion to retain it in selected position.

In witness whereof, we hereunto subscribe our names this 22d day of April, A. D. 1929.

HEYWARD WIRGMAN BOWLY.
WILLIAM WINEBIDDLE McWILLIAMS.